May 20, 1958  J. E. BUSKIRK  2,835,720
BATTERY VENT PLUG
Filed May 9, 1955

INVENTOR.
John E. Buskirk
BY
His Attorney

United States Patent Office 2,835,720
Patented May 20, 1958

---

2,835,720

BATTERY VENT PLUG

John E. Buskirk, Muncie, Ind., assignor to General Motors Corporation, Detroit, Mich., a corporation of Delaware Application May 9, 1955, Serial No. 506,870

1 Claim. (Cl. 136—177)

---

This invention relates to storage batteries and in particular to vent plugs for storage batteries.

It is conventional in the manufacture of storage batteries to provide vent plugs which provide communication between the cells thereof and the atmosphere to relieve vapor pressures developed in the cells but which operate to entrap splashed electrolyte and liquid entrained in the effluent and return it to the cells.

It is an object of this invention to provide a vent plug of moldable acid-resistant material comprising a cup-like lower portion and a cap having a downwardly extending tubular baffle which may be readily molded and assembled to form a rigid unitary structure.

It is a further object of this invention to provide a battery vent plug adapted to be secured in a cell wall, which comprises a cup-like lower portion rigidly attached to an upper cap portion having a tubular baffle extending downwardly in close proximity to the base of the lower portion to form a unitary structure having inner and outer chambers, and which includes an intake aperture disposed in the base of the lower portion, centrally of the tubular baffle, and an exhaust aperture in the cap disposed outwardly of the baffle, to provide a tortuous path for the flow of effluent and effectively entrap entrained liquid and return it to the cell.

Among the advantages of the present vent plug is its structural simplicity and relative ease of manufacture. It consists essentially of two parts, each having a configuration which may be readily molded and assembled and yet provides a baffling arrangement which is highly effective in preventing passage of electrolyte from a battery.

Further objects and advantages of the present invention will be apparent from the following description, reference being had to the accompanying drawings wherein preferred embodiments of the present invention are clearly shown.

Figure 1:
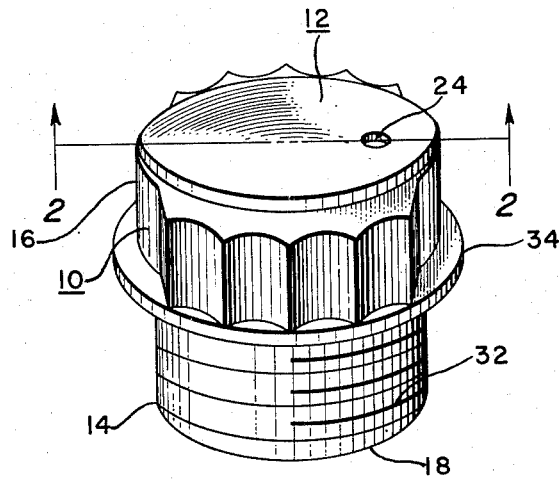
Figure 1 shows in perspective an assembled vent plug made in accordance with the present invention.
Figure 2:
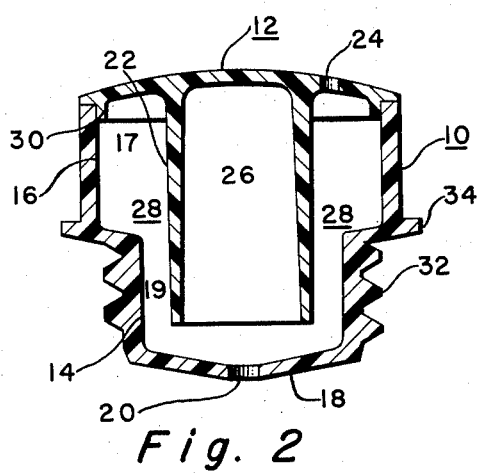
Figure 2 is a cross-sectional side view taken along line 2—2 of Figure 1.

Referring now to the drawings and in particular to Figure 2, the vent cap consists generally of a lower cup-like portion 10 and an upper inverted dish-shaped cap portion 12. Lower cup-like portion 10 has a lower barrel portion 14, an upper enlarged cylindrical portion 16, and a base 18. Base 18 slopes downwardly and radially and terminates in an aperture 20 disposed centrally thereof which forms an inlet opening into the vent plug.

The cap portion 12 has a relatively thin tubular skirt or baffle 22 of substantial diametrical dimension which, when in assembled relation with lower portion 10, extends downwardly into close proximity to base 18. An aperture 24 disposed in the cap close to and outwardly of baffle 22 forms an exhaust vent.

As is readily seen from Figure 2, the vent plug's lower portion 10 and upper portion 12, in assembled relation, form a cylindrical inner chamber 26 and an annular outer chamber 28. Baffle 22 is of substantial diameter in relation to the diameter of barrel portion 14 and enlarged portion 16, and is disposed centrally of intake aperture 20, and extends in close proximity to base 18. In this manner, effluent entering the plug is initially directed upwardly into the dome-like chamber 26. Outer chamber 28 has a lower portion 19 of relatively small annular dimension which serves as a passage between inner chamber 26 and the enlarged portion 17 of annular chamber 28.

In a preferred embodiment of the present vent plug, baffle 22 is cylindrical and has an average wall thickness of approximately .040", an internal diameter of about .406" and a length of about .45". The internal diameter of chamber 16 is about 1.156" and the internal diameter of barrel portion 14 is about .953". The diameter of intake aperture 20 is about .110" and the distance between the bottom of baffle 22 and base 18 is also about .110". Exhaust aperture 24 is about .078". It is apparent from these dimensions that the preferred embodiment has the intake part 20 of substantially the same diameter as the distance between the base of baffle 22 and base 18, that the diameter of chamber 26 is approximately equal or greater than the width of the annular chamber 17, and that the radial distance between the inner sides of barrel portion 14 and outer surfaces of baffle 22 is approximately equal to the radius of chamber 26. It may readily be seen that, with the preferred arrangement, the battery cell effluent is normally directed upwardly into chamber 26 and contacts considerable baffle surface area whereby entrained liquid is separated from the effluent. After reversing its direction, the effluent passes around the base portions of baffle 22 and through chamber portion 19 into chamber portion 17 where it comes in contact with considerable baffle area before passing out through the relatively small vent 24 to further separate entrained liquid from the effluent. Electrolyte which splashes into the vent plug is directed into chamber 26 and is effectively baffled from the exhaust vent 24. Electrolyte which is collected within the vent plug readily drains back into the cell through aperture 20 by reason of the sloped character of base 18.

The cap 12 is provided with a downwardly extending peripheral flange 30 which may be force fitted, cemented or otherwise suitably secured to lower portion 10 whereby flange 30 frictionally engages internal walls of lower vent plug portion 10 to provide a rigid, easily assembled unitary structure. The barrel portion 14 is provided with suitable means for securing the vent plug in the battery cell as, for example, threaded portions 32. The enlarged lower vent plug portion 16 together with a peripheral ridge 34 at the base thereof provides an abutment limiting the depth to which the vent plug may be inserted in the cell wall.

The vent plug may be molded of any suitable acid-resistant plastic material. For example, it may be made of polyethylene, polystyrene, colored if desired, or it may be formed from a hard rubber composition.

Although the present vent plug has been described and shown in terms of cylindrical surfaces, it is obvious that the various chamber and baffle surfaces may have various suitable polygonal configurations without departing from the spirit of the invention.

While the embodiments of the present invention as herein disclosed constitute preferred forms, it is to be understood that other forms might be adopted.

What is claimed is as follows:

A unitary vent plug formed of a moldable acid-resistant material and adapted to be removably secured in an opening of a battery cell wall or the like, comprising, an upper inverted dish-shaped cap portion, a lower cup-like portion having an upper enlarged cylindrical portion rigidly secured to an outer radial periphery of said upper cap portion, a lower reduced diameter barrel portion of said lower cup-like portion formed extending integrally from a juncture downwardly and radially inwardly of said upper enlarged cylindrical portion, a lateral peripheral ridge formed extending radially outwardly of said upper enlarged cylindrical portion adjacent the juncture of said upper enlarged cylindrical portion and said lower barrel portion, said ridge providing an abutment limiting the depth to which the vent plug can be inserted in the cell wall, a base formed integrally with said lower barrel portion and extending radially inwardly from a lower peripheral portion of said barrel portion while sloping downwardly to terminate in an aperture having a predetermined diameter provided for inlet of vapor and electrolyte drain-off in common, and a central tubular divider extending downwardly from said upper cap portion having an exhaust vent close to and radially outwardly of said divider, said divider forming first and second chambers each of substantial size with surface area concentrically above and radially outwardly of the vapor inlet and drain-off aperture so that passage of vapor upwardly must be reversed completely in direction to pass under a lower peripheral edge of said divider to pass from the first chamber inside said divider to the exhaust vent by way of the second chamber formed concentrically between said divider and said lower cup-like portion of the vent plug.

References Cited in the file of this patent

UNITED STATES PATENTS

| | | |
|---|---|---|
| 1,249,268 | Willard | Dec. 4, 1917 |
| 1,996,843 | Van Meter | Apr. 9, 1935 |
| 2,682,568 | Stofen | June 29, 1954 |

FOREIGN PATENTS

| | | |
|---|---|---|
| 166,186 | Great Britain | July 11, 1921 |
| 916,187 | Great Britain | Aug. 5, 1954 |